United States Patent
Dieudonne

(10) Patent No.: US 6,549,532 B1
(45) Date of Patent: Apr. 15, 2003

(54) ALLOCATION OF UPLINK RADIO RESOURCES IN A RADIO COMMUNICATION SYSTEM

(75) Inventor: Marc Dieudonne, Igny (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/440,130

(22) Filed: Nov. 15, 1999

(30) Foreign Application Priority Data

Nov. 16, 1998 (FR) .............................................. 98 14332

(51) Int. Cl.⁷ .......................... H04L 12/28; H04L 12/56; H04B 7/212
(52) U.S. Cl. ........................ 370/348; 370/418; 370/347; 370/345; 370/337; 370/263; 370/443; 370/458; 370/461; 370/412; 370/413; 370/414; 370/415; 370/416; 370/447; 709/500
(58) Field of Search ................................ 370/347, 348, 370/345, 263, 337, 443, 458, 461, 412, 413, 414, 415, 416, 447; 709/500

(56) References Cited

U.S. PATENT DOCUMENTS

| | | | |
|---|---|---|---|
| 5,471,474 A | * | 11/1995 | Grobicki et al. |
| 5,684,791 A | * | 11/1997 | Raychaudhuri |
| 5,875,309 A | * | 2/1999 | Itkowsky |
| 5,896,385 A | * | 4/1999 | Achilleoudis |
| 5,963,557 A | * | 10/1999 | Eng |
| 6,215,792 B1 | * | 4/2001 | Abi-Nassif |
| 6,349,095 B1 | * | 2/2002 | Hugenberg |
| 6,487,213 B1 | * | 11/2002 | Chao |

FOREIGN PATENT DOCUMENTS

EP  0 784 387 A2  7/1997

OTHER PUBLICATIONS

Walke, B. et al.: "Wireless ATM: Air Interface and Network Protocols of the Mobile Broadband System" IEEE Personal Communications vol. 3, No. 4, Aug. 1, 1996 pp. XP000623675 ISSN: 1070–9916.

Karol, M. J. et al.: "An Efficient Demand–Assignment Multiple Access Protocol For Wireless Packet (ATM Networks" Wireless Networks, vol. 1, No. 3, Oct. 1, 1995, pp. 267–279, XP000538240 ISSN: 1022–0038.

* cited by examiner

Primary Examiner—Kwang Bin Yao
Assistant Examiner—Kamran Emdadi
(74) Attorney, Agent, or Firm—Sughrue Mion, PLLC

(57) ABSTRACT

For allocating radio resources in a time-division multiple access packet mode radio communication system, each remote station stores transmit authorizations for each time slot of a frame in a table. The packets are stored in a plurality of queues in each remote station. The table is duplicated and one table is read during a frame while the other table is being written.

6 Claims, 1 Drawing Sheet

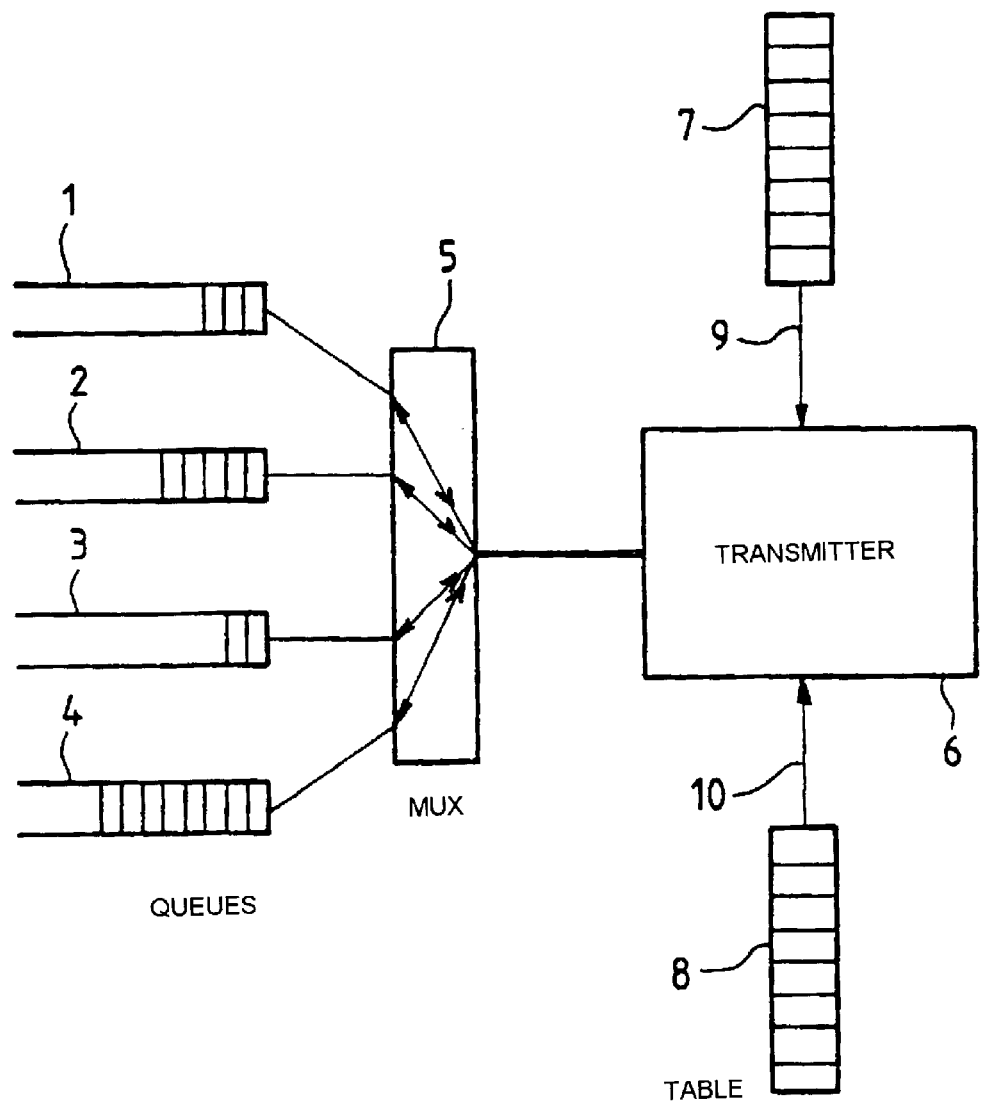

ALLOCATION OF UPLINK RADIO RESOURCES IN A RADIO COMMUNICATION SYSTEM

BACKGROUND OF THE INVENTION

1. Field of the Invention

The present invention concerns packet mode radio communications and more particularly the allocation of uplink radio resources in a radio communication system.

2. Description of the Prior Art

The problem arises in radio communication systems of allocating uplink radio resources between the various remote stations, in other words, the problem of managing multiple access. The problem does not arise on the downlink, i.e. in the direction from the gateway to the remote stations. For the uplink, i.e. in the direction from the remote stations to the gateway, it is necessary to arbitrate the use of radio resources between the remote stations.

There are two solutions to this problem. Firstly, multiple access can be managed by detecting collisions. In a protocol of this kind, the remote stations transmit without any synchronization being required and an information bit is transmitted correctly only if only one remote station transmits at a time. This type of protocol can be validly based only on a shared radio resource that is low in cost because its capacity is greatly increased compared to what is strictly necessary.

Access from the remote stations to the common radio resource can also be synchronized by a function which assigns multiple access requests (DAMA—dynamic allocation multiple access). This type of protocol is described by Argagnon C. et al. in "ANIS or providing multimedia services via satellites, though effective use of standards", IAF'98, Melbourne, for example.

U.S. Pat. No. 5,327,432 also addresses the problem of allocating time slots to remote stations of a time-division multiple access radio communication system. The solution proposed in this prior art document is for the gateway to transmit an allocation message which is processed in a remote station by a message-segmenting circuit. This prior art document is more particularly concerned with the time slot allocation protocol.

U.S. Pat. No. 5,363,374 describes an anticipatory method of allocating resources. To reduce the time needed to allocate resources, this prior art document proposes transmitting the resource reservation request before the total number of resources required is known.

Document EP 0.484.387 describes a method which entails maintaining an up-to-date list in a gateway of remote stations which are currently requesting transmission of packets of a given type and a given length. The gateway determines which remote stations are to be allocated time slots and transmits a frame which indicates the slots allocated for transmitting packets in the next frame. The slots allocated are defined by the respective positions in the frame of the identifiers of the remote stations that will be authorized to transmit.

The object of the invention is to improve on the above prior art methods.

SUMMARY OF THE INVENTION

To be more precise, the invention proposes a method of allocating uplink radio resources in a time-division multiple access packet mode radio communication system comprising at least one gateway and a plurality of remote stations each of which comprises means for storing packets to be transmitted, the method including the steps of:

storing packets to be transmitted from a remote station in a plurality of queues, referring to the identifiers of the queues of a remote station in the transmit authorizations for each time slot of a frame, during one frame, transmission by a gateway of transmit authorizations for a next frame which include the identity of a remote station authorized to transmit during said slot and which are written in at least one table in each remote station, and during the next frame, reading of the transmit authorizations in the table by each remote station and transmitting packets stored by each remote station as a function of the transmit authorizations read in this way.

The invention also proposes a remote station of a multiple access packet mode radio communication system for implementing the above method.

Other features and advantages of the invention will become apparent on reading the following description of one embodiment of the invention which is given by way of example and with reference to the accompanying drawing.

BRIEF DESCRIPTION OF THE DRAWING

The single FIGURE of the accompanying drawing is a diagrammatic representation of part of a remote station implementing the invention.

DETAILED DESCRIPTION OF THE PREFERRED EMBODIMENT

The invention is described hereinafter with reference to an ATM (asynchronous transfer mode) satellite telecommunication system. The period T of the uplink frame is divided into K time slots and in this example each of the K time slots corresponds to one ATM cell.

The invention proposes to provide each remote station with N memories or tables each with K locations corresponding to the K cells that can be transmitted during the period of the uplink frame, where N is an integer not less than two. During a frame period, the remote stations transmit during the K time slots according to the content of one of the memories. The other memory is updated for the next frame, on the basis of requests from the remote stations.

The FIGURE is a diagram showing part of a remote station implementing the invention. It shows various queues 1 through 4 of the remote station which contain cells to be transmitted. The outputs of the various queues are routed to a multiplexer 5 which selects cells to be transmitted in accordance with priority rules specific to each system. The mechanism for selecting cells from the various queues and the mechanism for managing queue overflows are not relevant to the invention and are not described further. The cells supplied by the multiplexer are transmitted by the remote station, as symbolized by the transmitter 6.

The remote station further comprises two tables or memories 7 and 8 each of which has K locations. The tables 7 and 8 are read and written alternately, one table being read during a period T while the other one is being written with information received from the gateway.

For a given uplink frame T, one table 7 or 8 of each remote station is read synchronously, for example under the control of a frame synchronization signal provided by the gateway. The tables read by the cells contain the transmit authorizations for the remote stations: each of the K lines of the table read during the frame corresponds to one of the K time slots and contains at most one authorization to transmit one cell for one of the remote stations. Reading the lines of the table therefore enables a remote station to determine in which time slot it is authorized to transmit. In the FIGURE, the respective arrows 9 and 10 from the tables 7 and 8 symbolize the fact that transmission of a cell by the transmitter 6 depends on the contents of the tables 7 and 8.

While one table is being read, the other table can be updated under the control of the gateway to indicate the transmit authorizations for the next frame. The table is advantageously updated as a function of requests transmitted by each remote station.

The invention ensures that at most one remote station can transmit a cell during a time slot of an uplink frame.

It is possible for no transmission authorization to be granted for a given line of the table being read, i.e. for a given time slot. In this case, one option is not to transmit any signal, in which case none of the remote stations transmits cells. Another option is to transmit an empty cell from one of the remote stations. In this case, the line of the table can have a content representative of the absence of authorization to transmit an active cell. The remote station which transmits the empty cell can be chosen either on the basis of the content of the line of the table (which can contain the name of the remote station to transmit an empty cell) or in accordance with a predetermined function, for example, such that the last remote station that transmitted an active cell must transmit an empty cell.

Priorities can be managed in accordance with the invention in the remote stations and/or in the gateway. Accordingly, if the various remote stations transmit to the gateway information representative of the priorities of the cells contained in the various queues, the transmit authorizations in the tables can indicate not only the remote station that can transmit but also the queue of the remote station from which the active cell to be transmitted must be taken.

Conversely, the invention can also be used in a system in which the remote stations supply to the gateway only an indication representative of the highest priority of the cells in the queue of the remote station. In this case, cells in the next frame are allocated as a function of this highest priority for each of the remote stations and in a given remote station lower priorities are managed locally.

Intermediate solutions are clearly possible, depending on the nature of the priority management scheme implemented in a given system.

Of course, the present invention is not limited to the examples and embodiments described and shown, and is open to many variants that will suggest themselves to the skilled person. In particular, it is not limited to a TDMA (time-division multiple access) system, but applies to any system in which radio resources must be shared between remote stations. The number of tables or memories is not limited to two, and there can be a greater number of tables or memories. This can be the case in particular if read and write mode synchronization in the tables makes it impossible to read a table in alternate frames. In this case three tables can be provided, which are read and written alternately. The invention is not limited to a system in which each time slot of a frame corresponds to a cell, but applies more generally to time slots comprising more than one cell.

What is claimed is:

1. A method of allocating uplink radio resources for a plurality of remote stations of a time-division multiple access packet mode radio communication system, said remote stations each including a plurality of queues for storing packets to be transmitted to at least one gateway via frames including a plurality of slots, said method comprising the steps of:

during a first frame,
reading transmit authorizations for said first frame from a first table in each of said remote stations, said transmit authorizations including identifiers of said remote stations authorized to transmit said packets during each of said slots,
transmitting packets stored in said queues of said remote stations in said slots of said second frame based on said transmit authorizations for said first frame read from the first table,
receiving from said gateway transmit authorizations for a second frame immediately following said first frame, and
writing said transmit authorizations for said second frame in a first table in each of said remote stations; and during said second frame,
reading said transmit authorizations for said second frame in said table by each of said remote stations,
transmitting packets stored in said queues of said remote stations in said slots of said second frame based on the transmit authorizations for said second frame read from the second table,
receiving from said gateway transmit authorizations for a third frame immediately following said second frame, and
writing said transmit authorizations for said third frame in said first table in each of said remote stations.

2. The method as claimed in claim 1, wherein said transmit authorizations identify said queues of said remote stations from which said packets are to be retrieved for transmission during each of said slots.

3. The method as claimed in claim 1, wherein each frame includes K time slots each corresponding to one ATM cell, and said first and second tables are provided with K locations for storing said transmit authorizations.

4. A remote station of a time-division multiple access packet mode radio communication system, comprising:

a plurality of queues for storing packets to be transmitted to at least one gateway;
at least first and second tables for storing transmit authorizations received from said gateway, wherein said transmit authorizations include identifiers of said remote stations authorized to transmit said packets stored in said queues during each of a plurality of slots of a frame; and
a transmitter for transmitting to said gateway said packets stored in said queues based on said transmit authorizations stored in said first and second tables,
wherein during a first frame, said packets are selected from in said queues and transmitted in said slots of said first frame based on transmit authorizations for said first frame which are read from said first table, and transmit authorizations for a second frame immediately following said first frame are received from said gateway and stored in said second table, and
wherein during said second frame, said packets are selected from said queues and transmitted to said gateway in said slots of said second frame based on said transmit authorizations for said second frame which are read from said second table, and transmit authorizations for a third frame immediately following said second frame are received from gateway and stored in said first table.

5. The remote station claimed in claim 4, wherein said transmit authorizations identify said queues of said remote stations from which said packets are to be selected for transmission during each of said slots.

6. The remote station as claimed in claim 4, wherein each frame includes K time slots each corresponding to one ATM cell, and said first and second tables are provided with K locations for storing said transmit authorizations.

* * * * *